(12) United States Patent
Gill et al.

(10) Patent No.: US 10,715,592 B2
(45) Date of Patent: Jul. 14, 2020

(54) NETWORK NODE, ENDPOINT NODE AND METHOD OF RECEIVING AN INTEREST MESSAGE

(71) Applicants: Koninklijke KPN N.V., Rotterdam (NL); Nederlandse Organisatie voor Toegepast-Natuurweten schappelijk Onderzoek TNO, s-Gravenhage (NL)

(72) Inventors: Amritpal Singh Gill, Delft (NL); Lucia D'Acunto, Delft (NL); Konstantinos Trichias, Athens (GR); Ray van Brandenburg, Rotterdam (NL); Eelco Cramer, Amsterdam (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/099,679

(22) PCT Filed: May 12, 2017

(86) PCT No.: PCT/EP2017/061465
§ 371 (c)(1),
(2) Date: Nov. 7, 2018

(87) PCT Pub. No.: WO2017/194738
PCT Pub. Date: Nov. 16, 2017

(65) Prior Publication Data
US 2019/0306234 A1    Oct. 3, 2019

(30) Foreign Application Priority Data
May 13, 2016  (EP) .................................. 16169624

(51) Int. Cl.
*H04L 29/08*    (2006.01)

(52) U.S. Cl.
CPC .......... *H04L 67/1076* (2013.01); *H04L 67/02* (2013.01); *H04L 67/1097* (2013.01);
(Continued)

(58) Field of Classification Search
CPC ............. H04L 67/1076; H04L 67/2852; H04L 67/2842; H04L 67/02; H04L 67/1097; H04L 67/327
See application file for complete search history.

(56) References Cited

U.S. PATENT DOCUMENTS 8,566,626 B2 * 10/2013 Dutton .................. G06F 1/3221
713/320
2007/0088703 A1 * 4/2007 Kasiolas ............... G06F 3/0605
(Continued)

FOREIGN PATENT DOCUMENTS

| WO | 20130130359 A1 | 9/2013 |
| WO | 2016010695 A1 | 1/2016 |

OTHER PUBLICATIONS

European Patent Office, Extended European Search Report for EP Pat. App. No. 16169624.0 dated Oct. 24, 2016.
(Continued)

*Primary Examiner* — Benjamin M Thieu
(74) *Attorney, Agent, or Firm* — McDonnell Boehnen Hulbert & Berghoff LLP

(57) ABSTRACT

The invention relates to a network node (15) comprising at least one communication interface, at least one memory, and at least one processor. The at least one processor is configured to receive an interest message on the at least one communication interface from a downstream node (14), the interest message comprising a name of a requested data object, to determine whether to bid for storing the requested data object in the at least one memory, to calculate a bid value, to forward the interest message to an upstream node
(Continued)

(16) on the at least one communication interface, the interest message including the calculated bid value in dependence on at least the determination whether to bid, to receive a data message comprising the requested data object from the upstream node on the at least one communication interface, to determine from at least the data message whether the network node won the bid, to store the data object in the at least one memory if the network node won the bid, and to forward the data message to the downstream node on the at least one communication interface.

16 Claims, 11 Drawing Sheets

(52) U.S. Cl.
CPC ...... *H04L 67/2842* (2013.01); *H04L 67/2852* (2013.01); *H04L 67/327* (2013.01)

(56) References Cited

U.S. PATENT DOCUMENTS

2014/0164552 A1   6/2014   Kim et al.
2015/0256601 A1   9/2015   Mosko

OTHER PUBLICATIONS

International Searching Authority, International Search Report and Written Opinion for PCT Pat. App. No. PCT/EP2017/061465, dated Jun. 21, 2017.
R. Fielding et al., Hypertext Transfer Protocol (HTTP/1.1): Caching draft-ietf-httpbis-p6-cache-26, Feb. 6, 2014, retrieved from the Internet at tools.ietf.org/html/draft-ietf-httpbis-p6-cache-26 (last visited Nov. 7, 2018).
V. Sourlas et al., "Distributed Cache Management in Information-Centric Networks", IEEE Transactions on Network and Service Management, Sep. 2013, vol. 10, No. 3, pp. 286-299.
G. Zhang et al., "Caching in information centric networking: A survey", Computer Networks 57 (2013), available on line on Aug. 8, 2013, pp. 3128-3141.
Carofiglio, Giovanna et al., LAC: Introducing Latency-Aware Caching in Information-Centric Networks. Conference: 2015 IEEE 40th Conference on Local Computer Networks (LCN 2015).
Suksomboon, Kalika et al., PopCache: Cache More or Less Based on Content Popularity for Information-Centric Networking, 38th Annual IEEE Conference on Local Computer Networks, Sydney, NSW, 2013, pp. 236-243.
Psara, Ioannis et al., Probabilistic In-Network Caching for Information-Centric Networks, Publication: ICN '12: Proceedings of the second edition of the ICN workshop on Information-centric networking Aug. 2012 pp. 55-60.
Psaras, Ioannis et al., In-Network Cache Management and Resource Allocation for Information-Centric Networks, IEEE Transactions on Parallel and Distributed Systems, vol. 25, No. 11, Nov. 2014, pp. 2920-2931.
Ming, Zhongxing et al., Age-based Cooperative Caching in Information-Centric Networking, 2014 23rd International Conference on Computer Communication and Networks (ICCCN).
Sourlas, Vasilis et al., Distributed Cache Management in Information-Centric Networks, IEEE Transactions on Network Service Management, vol. 10, No. 3, Sep. 2013.
Want, Yu et al., Hop-based Probabilistic Caching for Information-Centric Networks, Globecom 2013—Next Generation Networking Symposium, p. 2102-2107.
Zhang, Lixia et al., Named Data Networking, ACM SIGCOMM Computer Communication Review, vol. 44, No. 3, Jul. 2014, p. 66-73.

\* cited by examiner

NETWORK NODE, ENDPOINT NODE AND METHOD OF RECEIVING AN INTEREST MESSAGE

CROSS REFERENCE TO RELATED APPLICATIONS

This application is a national stage entry of, and claims priority to, PCT Pat. App. No. PCT/EP2017/061465, filed May 12, 2017, which claims priority to European Pat. App. No. 16169624.0, filed May 13, 2016, all of which are fully incorporated herein by reference for all purposes.

FIELD OF THE INVENTION

The invention relates to a network node.

The invention further relates to a method of receiving an interest message, in particular to a method of receiving an interest message and a data message.

The invention further also relates to a method of receiving an HTTP request, in particular to a method of receiving an HTTP request and a response message.

The invention also relates to a computer program product enabling a computer system to perform such a method.

The invention further relates to an endpoint node for transmitting an interest message.

BACKGROUND OF THE INVENTION

Information-Centric Networking (ICN) is a new networking paradigm with the goal of evolving the current Internet infrastructure away from a host-oriented system towards a data-oriented system. Instead of addressing endpoints via IP addresses, data itself is addressed in ICN. By dividing data into chunks, and giving each of those chunks a unique and hierarchical name, ICN allows clients to ask the network for a given named data object, without having to worry where that data is located/stored. One of the benefits of naming data is that each intermediate network node, such as a switch or a router, has the ability to cache the data packets that flow through it. In this way, if a new consumer requests data which is already cached in the network, its request does not need to travel through the network towards the original producer of the data, but can instead be served by one of the intermediate network nodes holding a copy of that data.

Current ICN architectures have two elementary types of messages at their core: interest messages and data messages. When an application wants to retrieve a particular data object, it sends out an interest message for that data object. The most important part of this interest message is the name of the object, or, in cases where the full name of the object is not known, a prefix.

An example of such an ICN architecture is Named Data Networking (NDN) described in "Named data networking", Zhang et al., ACM SIGCOMM Computer Communication Review 44 Issue 3, July 2014, pages 66-73. When a network node receives an interest message in NDN, it first checks whether its local cache happens to contain a named data object that matches the name in the interest message. If a corresponding named data object is found, it is wrapped in a data message and sent back over the interface over which the interest message was received.

In the case where the object is not cached, the next step is to check whether the requested name is already in the so-called Pending Interest Table (PIT). The PIT maintains a list of existing, pending data object requests and the corresponding interfaces through which they were requested. When a data message comes in, it is forwarded to all interfaces that according to the PIT have an unsatisfied interest for the corresponding name. The entry in the PIT is then deleted. When a name in an incoming interest message is not listed in the PIT, it is added along with the interface over which it was received. The interest message is then forwarded on one or more outgoing interfaces according to the Forwarding Information Base (FIB) and the Strategy layer, in search of the requested data at another node.

Caching in ICN has the potential of decreasing the latency experienced by the consumer while reducing network traffic at the same time. However, since any node on the path from the source of content (which may be an intermediate caching node or the original producer) to the consumer can cache content, managing the caching decisions of caching nodes becomes crucial to avoid inefficient usage of such in-network caching capacity and suboptimal performance in terms of traffic and latency. Important caching decisions that need to be carefully managed are: 1. which data item should a specific cache store, and 2. if the cache storage is full, which data item should be replaced.

It appears evident that inefficient caching decisions are more likely to happen when nodes make such decisions independently from each other, based solely on "local" information (i.e. information available at each caching node itself, such as the items being requested, the items being cached, the frequency of requests, etc.), which is the standard approach in ICN. However, it becomes necessary to consider some level of the "global" picture (e.g. is the newly received item already cached in a neighbouring cache? is the data that a cache currently stores more popular than a newly received item?) to make efficient caching decisions in an Information-Centric Network.

"Age-based cooperative caching in information-centric networking", Zhongxing Ming, Mingwei Xu, and Dan Wang, 23rd International Conference on Computer Communication and Networks, 2014, published by IEEE, discloses a method in which items are stored in a cache along with an age field that indicates an expiry time. When the expiry time lapses, the item is replaced by another item. The value of the age field stored along with the item in the cache is based on an age field in the received data message that comprises the item. The age of an item is set by the first node along the path based on the popularity of the item. Each subsequent node along the path increases (e.g. doubles) the age in the data message before forwarding the data message. The result is that caches at the edge comprise mostly popular items, while caches further away from the edge also comprise less popular items. An advantage of this method is that it does not require (separate) signalling messages between routers.

A drawback of this method is that the caches are not used efficiently, because certain popular items are likely cached both at the edge and at one or more nodes further away from the edge, while certain less popular items are likely not cached at all.

The use of caches is also known in other types of networks, since it is advantageous to use caches for preventing that each request needs to travel through a complete network to a server that can handle the request. Popular content is often stored in a cache to save bandwidth, reduce server load and improve client response times.

For example, Network Service Providers (NSP) may use caching proxies in their networks to more efficiently utilize their networks. A caching proxy is a proxy server which is able to cache content and act as an intermediate network node for HTTP requests and responses. For example, in case of a content network, multiple caching proxies may reside on various points between a User Agent (UA) and a Content Service Provider (CSP). The major difference is, that within the context of ICN the data is addressed while in HTTP the location of data is addressed.

Since both HTTP requests and responses flow through these caching proxies, each server decides for itself whether to cache the requested data object or not. This decision may be based upon local policies. A caching proxy may decide for example only to cache popular heavily requested items or evaluate HTTP headers to choose whether or not to cache the content.

A drawback of caching proxies is that each server decides for itself whether or not to store a data object, often resulting in popular content being stored in multiple caching proxies between e.g. the User Agent (UA) and the Content Service Provider (CSP) and less requested content not being stored at all, hence making an inefficient use of the available caching capacity.

SUMMARY OF THE INVENTION

It is a first object of the invention to provide a network node, which facilitates a more efficient use of caches in an information-centric network.

It is a second object of the invention to provide a method of receiving an interest message, which facilitates a more efficient use of caches in an information-centric network.

It is a third object of the invention to provide an endpoint node, which facilitates a more efficient use of caches in an information-centric network.

It is a fourth object of the invention to provide a network node, which facilitates a more efficient use of caches in a content network.

It is a fifth object of the invention to provide a method of receiving an HTTP request for a data object, which facilitates a more efficient use of caches in a network.

According to the invention, the first object is realized in that the network node comprises at least one communication interface, at least one memory, and at least one processor configured to receive an interest message on said at least one communication interface from a downstream node, said interest message comprising a name of a requested data object, to determine whether to bid for storing said requested data object in said at least one memory, to calculate a bid value, to forward said interest message to an upstream node on said at least one communication interface, said interest message including said calculated bid value in dependence on at least said determination whether to bid, to receive a data message comprising said requested data object from said upstream node on said at least one communication interface, to determine from at least said data message whether said network node won said bid, to store said data object in said at least one memory if said network node won said bid, and to forward said data message to said downstream node on said at least one communication interface.

The inventors have recognized that by limiting the amount of network nodes in the path of a data message that cache an item received in the data message, a more efficient use of caches in an information-centric network is realized. This is achieved by allowing network nodes to bid for storing the item in their cache, thereby competing against other network nodes along the path or against other network nodes in the same group of network nodes along the path. In other words, the right to cache an item is auctioned. This reduces the probability that less popular items are not cached at all. It may also achieve an optimized spreading of the content across the network (less server hits), thereby increasing its robustness with respect to content producers going offline. Further, it may reduce the latency experienced by requesting nodes without increasing the network traffic. More advantages may be for example: optimized caching based on geographical and/or timing components of requests, taking into account individual node properties, inter-node coordination in caching with minimal overhead.

If the at least one communication interface comprises multiple communication interfaces, the interest message is preferably received on another communication interface than on which it is forwarded. The interest message is forwarded according to the node's forwarding rules. The data message is normally received from the upstream node on the same communication interface on which the interest message was forwarded to the upstream node. If the at least one communication interface comprises a single interface, e.g. a wireless interface, the network node may forward the interest message on the same communication interface it received the interest message from.

The at least one processor may calculate the bid value before determining whether to bid for storing the requested data object in the at least one memory. For example, the at least one processor may determine to bid only when the calculated bid value is higher or lower than a certain threshold or falls within a certain range. Alternatively, the at least one processor may calculate the bid value after deciding to bid for storing the requested data object in the at least one memory. For example, the at least one processor may calculate the bid value only when the at least one memory has an empty slot or at least one of the already cached data objects is older than a certain age.

The bid value may be calculated based on one or more parameters. A parameter may be related to the local situation of a node, such as the cache size or the bandwidth of the upstream link. Additionally, a parameter may capture the "context" of that particular request, which relates to the content and/or the network. For example, a parameter may be content-related, e.g. popularity of an item or desired latency for an item, or network-related, e.g. amount of hops from the originator of the interest message to the network node or network latency experienced by the interest message. A downstream node is a node that transmits an interest message to the network node and receives a data message from the network node, i.e. node on the interest/data path that is located closer to the original data requester than the current node. An upstream node is a node that receives an interest message from the network node and transmits a data message to the network node, i.e. a node on the interest/data path that is located further away from the original data requester than the current node.

Said received interest message may further comprise a received bid value and said at least one processor may be configured to include said calculated bid value in said interest message if said determination whether to bid was positive and said calculated bid value represents a higher bid than said received bid value. In a first embodiment, a higher bid value represents a higher bid, and in a second embodiment, a lower bid value represents a higher bid. If the network node is not the first node according to the invention that receives the interest message, then the interest message will already comprise a bid value when the interest message is received by the network node. In one embodiment, if the calculated bid value does not represent a higher bid than the received bid value, the network node has lost the bid. In an alternative embodiment, if the calculated bid value does not represent a higher bid and is not the same as the received bid value, the network node has lost the bid. If the network node has lost the bid, it does not modify the received bid value in the received interest message before forwarding the interest message to the upstream node.

Said at least one processor may be further configured to record bidding information in said at least one memory, said bidding information representing whether said network node included said calculated bid value in said interest message. This bidding information, e.g. a True or False value, is stored before the network node forwards the interest message and may later be used when the network node receives the data message, for example as described in the next two paragraphs.

Said at least one processor may be configured to determine from at least said data message and said bidding information whether said network node won said bid. The recorded bidding information is beneficial when the network node is not able to determine from the data message alone whether it has won the bid. For example, the network node may only be able to determine from the data message that it has won the bid if the condition that it had the highest bid at the time of forwarding the interest message, which is indicated by the bidding information and cannot be determined from the data message, is met. This is explained in more detail in the next paragraph.

In an alternative embodiment, the network node is able to determine from the data message alone whether it has won the bid, e.g. when the data message comprises a unique identifier (e.g. IP address or MAC address) of the network node that won the bid, or optionally multiple unique identifiers if the auction algorithm allows for multiple auctions to take place within one interest path. In another alternative embodiment, when bid values are not likely to be identical, the calculated bid value itself is stored in the at least one memory if the network node included its calculated bid value in the interest message and the winning bid value or values is or are included in the data message. This allows the network node to determine whether it has won the bid by comparing the stored bid value with the winning bid value(s) in the received data message.

Said data message may comprise an ignore counter, said ignore counter representing an amount of downstream nodes that lost said bid as determined by said upstream node or a further upstream node, and said at least one processor may be configured to determine from at least said ignore counter and said bidding information whether said network node won said bid. A network node is able to determine whether it has the highest bid so far, but not whether any network nodes which are still to receive the interest message are going to calculate a higher bid value. If a network node further along the path of the interest message calculates a higher bid value, it knows that the previous nodes along the path or the previous nodes in the same group of network nodes along the path did not win the bid and may set the ignore counter of the returning data message to the amount of previous nodes that did not win the bid. A network node that included a calculated bid value in the interest message may subsequently determine that it has not won the bid when the ignore counter is not zero.

Said at least one processor may be further configured to increment a node counter in said interest message before forwarding said interest message to said upstream node, said node counter representing an amount of downstream nodes. This allows a network node further along the path of the interest message which calculates a higher bid value to determine an amount of previous nodes that did not win the bid and store this amount in its at least one memory if it includes its bid value in the interest message that it forwards. The node counter may be incremented by increasing a value with respect to a reference number, e.g. 0, 1, 2, 3, etc., or by decreasing a value with respect to a reference number, e.g. 1000, 999, 998, etc., for example. The network node may reset the node counter when it is the first or last node in a group of network nodes participating in an auction, e.g. when the node counter reaches or exceeds a threshold.

Said at least one processor may be further configured to record a losing bidder count in said at least one memory if said network node included said calculated bid value in said interest message, said losing bidder count being based on said node counter included in said received interest message and representing an amount of downstream nodes that lost said bid as determined by said network node. The losing bidder count may be used to set the ignore counter when the network node receives the data message and determines that it has won the bid, for example. Said network node may increase said node counter included in said received interest message, store said increased node counter as said losing bidder count and forward said interest message including said increased node counter, for example. Alternatively, said network node may store said received node counter as said losing bidder count, increase said node included in said received interest message and forward said interest message including said increased node counter, for example.

Said at least one processor may be configured to set said ignore counter in said data message based on said losing bidder count before forwarding said data message to said downstream node if said network node won said bid. The ignore counter may be set to the node counter that was stored as the losing bidder count when the interest message was received, for example. This allows the network node to use the data message to inform previous nodes along the interest message path or previous nodes in the same group of network nodes along the interest message path, which are still to receive the data message, that they did not win the bid, for example.

According to the invention, the second object is realized in that the method of receiving an interest message comprises the steps of receiving an interest message on at least one communication interface from a downstream node, said interest message comprising a name of a requested data object, determining whether to bid for storing said requested data object in at least one memory, calculating a bid value, forwarding said interest message to an upstream node on said at least one communication interface (or on a different communication interface, if any, according to the node's forwarding rules), said interest message including said calculated bid value in dependence on at least said determination whether to bid, receiving a data message comprising said requested data object from said upstream node on said at least one communication interface, determining from at least said data message whether said network node won said bid, storing said data object in said at least one memory if said network node won said bid, and forwarding said data message to said downstream node on said at least one communication interface. Said method may be performed by software running on a programmable device. This software may be provided as a computer program product.

Said received interest message may further comprise a received bid value and said method may further comprise the step of including said calculated bid value in said interest message if said determination whether to bid was positive and said calculated bid value represents a higher bid than said received bid value.

Said method may further comprise recording bidding information in said at least one memory, said bidding information representing whether said network node included said calculated bid value in said interest message. Said step of determining from at least said data message whether said network node won said bid may comprise determining from at least said data message and said bidding information whether said network node won said bid. Said received data message may comprise an ignore counter, said ignore counter representing an amount of downstream nodes that lost said bid as determined by said upstream node or a further upstream node, and said step of determining from at least said data message whether said network node won said bid may comprise determining from at least said ignore counter and said bidding information whether said network node won said bid.

Said method may further comprise incrementing a node counter in said interest message before forwarding said interest message to said upstream node, said node counter representing an amount of downstream nodes. Said method may further comprise recording a losing bidder count in said at least one memory if said network node included said calculated bid value in said interest message, said losing bidder count being based on said node counter included in said received interest message and representing an amount of downstream nodes that lost said bid as determined by said network node. Said method may further comprise setting said ignore counter in said data message based on said losing bidder count before forwarding said data message to said downstream node if said network node won said bid.

According to the invention, the third object is realized in that the endpoint node comprises at least one communication interface and at least one processor configured to determine a name of a requested data object, to create an interest message comprising said name of said requested data object and a bid field for inserting a bid value, said bid value being left undefined so as to indicate that an auction of the right to cache said requested data object should start, and to transmit said interest message to an upstream node on said at least one communication interface.

According to the invention, the fourth object is realized in that the network node comprises at least one communication interface, at least one memory, and at least one processor configured to receive an HTTP request for a data object on said at least one communication interface from a downstream node, to determine whether to bid for storing said requested data object in said at least one memory, to calculate a bid value, to forward said HTTP request to an upstream node on said at least one communication interface, said HTTP request including said calculated bid value in dependence on at least said determination whether to bid, to receive a response message comprising said requested data object from said upstream node on said at least one communication interface, to determine from at least said response message whether said network node won said bid, to store said data object in said at least one memory if said network node won said bid, and to forward said response message to said downstream node on said at least one communication interface.

According to the invention, the fifth object is realized in that the method of receiving an HTTP request comprises the steps of receiving an HTTP request for a data object on at least one communication interface from a downstream node, determining whether to bid for storing said requested data object in at least one memory, calculating a bid value, forwarding said HTTP request to an upstream node on said at least one communication interface (or on a different communication interface, if any, according to the node's forwarding rules), said HTTP request including said calculated bid value in dependence on at least said determination whether to bid, receiving a response message comprising said requested data object from said upstream node on said at least one communication interface, determining from at least said response message whether said network node won said bid, storing said data object in said at least one memory if said network node won said bid, and forwarding said response message to said downstream node on said at least one communication interface. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: receiving an interest message on at least one communication interface from a downstream node, said interest message comprising a name of a requested data object, determining whether to bid for storing said requested data object in at least one memory, calculating a bid value, forwarding said interest message to an upstream node on said at least one communication interface, said interest message including said calculated bid value in dependence on at least said determination whether to bid, receiving a data message comprising said requested data object from said upstream node on said at least one communication interface, determining from at least said data message whether said network node won said bid, storing said data object in said at least one memory if said network node won said bid, and forwarding said data message to said downstream node on said at least one communication interface.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
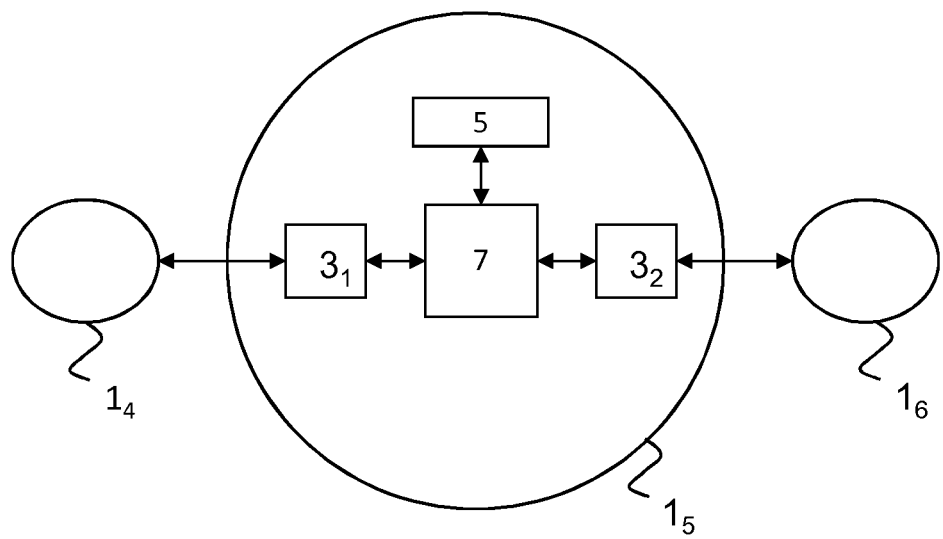
FIG. 1 is a block diagram of an embodiment of the network node of the invention.

The invention relates to a network node comprising at least one communication interface, at least one memory, and at least one processor. In the embodiment shown in FIG. 1, the network node $1_5$ comprises two communications interfaces $3_{1-2}$, one memory 5 and one processor 7. The processor 7 is configured to receive an interest message on the communication interface $3_1$ from a downstream node $1_4$. The interest message comprises a name of a requested data object. The processor 7 is further configured to determine whether to bid for storing the requested data object in the memory 5. The processor 7 is further configured to calculate a bid value. The processor 7 is further configured to forward the interest message to an upstream node $1_6$ on the communication interface $3_2$. The interest message includes the calculated bid value in dependence on at least the determination whether to bid. The processor 7 is further configured to receive a data message comprising the requested data object from the upstream node $1_6$ on the communication interface $3_2$. The processor 7 is further configured to determine from at least the data message whether the network node won the bid. The processor 7 is further configured to store the data object in the memory 5 if the network node won the bid. The processor 7 is further configured to forward the data message to the downstream node $1_4$ on the communication interface $3_1$. Network node $1_5$ is also referred to as a "caching node" in this description (to distinguish it from other nodes on the interest/data path that may not be configured to store data items and may not be configured to change interest and data messages).

The network node $1_5$ may be a dedicated network router, for example, but may also, for example, be a user device (with or without a user interface), e.g. a mobile phone or a device embedded in a vehicle. The at least one processor may comprise one or more general-purpose processors and/or one or more application specific processors. The processor 7 may be an ARM processor, for example. The at least one memory may comprise one or more magnetic hard disks, one or more optical drives, and/or one or more solid state memories, for example. The data object(s) may be stored in the same memory or in a different memory than other information like a Pending Interest Table (PIT) or a network node configuration. The at least one communication interface may comprise one or more optical ports and/or one or more Ethernet ports, for example.

Figure 2:
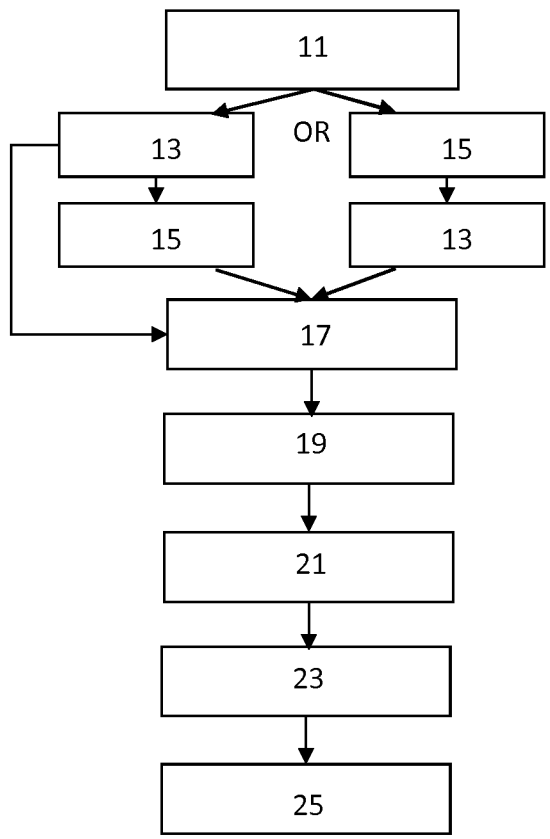
FIG. 2 is a flow diagram of an embodiment of the method of the invention.

The method of receiving an interest message of the invention comprises at least eight steps, see FIG. 2. A step 11 comprises receiving an interest message on at least one communication interface from a downstream node, the interest message comprising a name of a requested data object. A step 13 comprises determining whether to bid for storing the requested data object in at least one memory. A step comprises calculating a bid value. Step 15 may be performed after or before step 13, for example. When it is determined not to bid in step 13, step 15 may be skipped. The bid value calculated in step 15 may be used in step 13 to determine whether to bid or not.

A step 17 comprises forwarding the interest message to an upstream node on the at least one communication interface, the interest message including the calculated bid value in dependence on at least the determination whether to bid. A step 19 comprises receiving a data message comprising the requested data object from the upstream node on the at least one communication interface. A step 21 comprises determining from at least the data message whether the network node won the bid. A step 23 comprises storing the data object in the at least one memory if the network node won the bid. A step 25 comprises forwarding the data message to the downstream node on the at least one communication interface.

In other words, caching nodes situated on the path that an interest message travels through participate in an auction to win the right to cache the data which will be returned in response to that interest message (by a data message). Performing an auction on the right to cache allows the caching nodes on the request path to coordinate about which one of them is going to store a copy of the data object, thereby avoiding redundant caching due to individual decisions. To limit the overhead of electing and signalling the auction winner, the auction is not performed centrally but rather in a distributed fashion: the currently highest bid value is piggybacked in the interest message and each caching node decides whether to bid or not based on the bid value in the interest message and on the own bid that the cache itself can issue (the value of the bid that a caching node can issue may be based on local parameters of the node, as well as on the request context).

If a caching node decides to bid, it will replace the current highest bid in the interest message with its own bid value before forwarding the interest message to the next node. The final decision of which node has won the auction is communicated to the participating caching nodes through piggybacking it in the returning data message. This approach allows caching nodes to collaborate in the decision about which of them is going to cache the item, as well as to (optionally) enrich the information that brings to this decision (with the request context), without the need for extra or heavy signalling.

For the selection of the value to bid, a caching node may use both local information and the request context. The parameters describing the request context may be piggybacked in the interest message in order to minimize overhead or may be included in special messages, for example.

Figure 3:
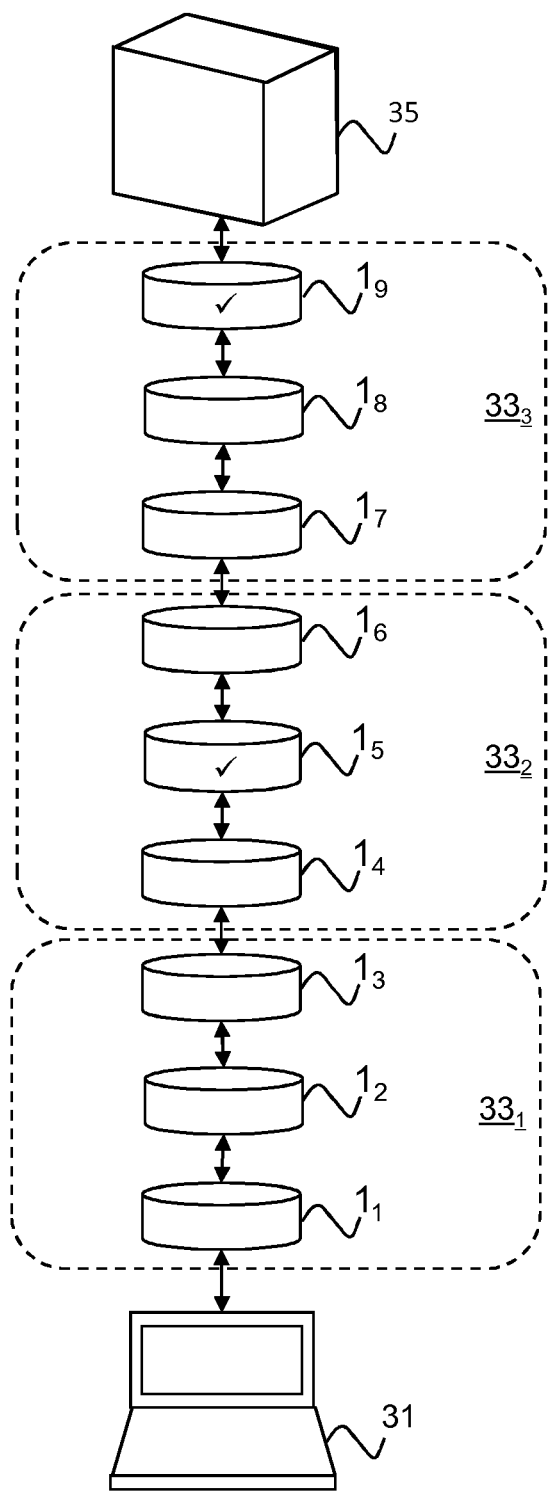
FIG. 3 shows an example of a network path that includes multiple nodes.

To control data redundancy, multiple caching nodes may cache the same data object. This may be realized by clustering the caching nodes on the request path in different groups and performing a separate auction for each group. In FIG. 3, eleven nodes are depicted of which nine are caching nodes $1_1$-$1_9$, one is a user device 31 from which a request/interest originates and one is a server 35 from which a data object originates. The caching nodes $1_1$-$1_9$ are clustered in three groups $33_{1-3}$. A certain data object is cached in caching node $1_5$ of group $33_2$ and in caching node $1_9$ of group $33_3$. Decisions regarding data redundancy may be based on a combination of local information and request context, or might be decided by the network administrator based on network statistics, for example.

The certain data object is not cached in group $33_1$, because the caching nodes in this group hold already very popular content (e.g. because these nodes are located close to another user device) and none of the caching nodes of group $33_1$ participated in the auction as a result. These caching nodes used an auction threshold to determine whether to participate in the auction or not: if a caching node has data that is older than the auction threshold, it qualifies to take part in an auction. The value for the auction threshold may be based on a combination of local and global information (if available), or might be decided by the network administrator based on network statistics. The routing path depicted in FIG. 3 has been determined based on the name of the requested data object.

A caching node may take into account one or more parameters when determining whether to bid and when calculating a bid value. The following are examples of local aspects that a caching node could take into account:

LRU: the timestamp of the Least Recently Used item. The LRU value should be weighted appropriately in order to avoid cases where items requests could be the result of real time applications (like sensor output) whose older values are of no use in future, and could result in a waste of caching resources.

LFU: the request count of the least frequently used item. LRU and LFU reflect the popularity of the already cached data, as perceived by the node.

BWIN: the BandWidth of the INcoming data link. In case the bandwidth of the incoming data link is small, a caching node would like to bid higher in order to avoid more traffic on smaller links. BWIN reflects the current conditions of the network surrounding the caching node. Additionally or alternatively, the bandwidth of the outgoing data link could be taken into account.

CS: the Cache Size of the node. CS reflects the caching capacity of the node's cache.

RC: the Rate of Caching (i.e. the number of objects cached per unit of time). The fraction of incoming data to the cache size could provide an estimate on the performance of the caching node. RC reflects how quickly the data currently changes in the node's cache. Thus a weight could be assigned to CS and/or RC that will help more important caching nodes to bid higher.

INC: the count of times that the same interest message arrived at the node but was Not Cached. A temporary count be maintained of the interests that were previously requested but never cached. This count helps in the search of highly popular data items, which could then be assigned higher weights during the bidding process. INC reflects the popularity of the newly received data.

In addition, there are several non-local parameters ("request context") a caching node could take into account:

HOP: distance (in hops) from the requester. Information on the number of hops a caching node is away from the requesting user (device) could help in assigning low caching probability for nodes that are further away from the user (device), and vice versa.

L: Latency of the interest message.

A bid value may be calculated, for example, by determining a weighted sum of one or more of the above local and context parameters, where each weight gives more or less emphasis to each of the aspects. The weights could be for instance network dependent or just set by the network administrator at will.

For example, a bid could be calculated by three competing nodes (R1-R3) with the following equation:

$$\text{Bid }(R_x) = \left[w_1 * \arctan\left(\frac{LRU}{LRU_{MAX}/\alpha_1}\right) * \frac{2}{\pi}\right] + \left[w_2 * \arctan\left(\frac{1/LFU}{1/LFU_{MAX}/\alpha_2}\right) * \frac{2}{\pi}\right] + \left[w_3 * \arctan\left(\frac{CS}{CS_{MAX}/\alpha_3}\right) * \frac{2}{\pi}\right]$$ (Equation 1)

For this example it is assumed that all three nodes will decide their bid based on three parameters, namely the Least Recently Used (LRU) value, the Least Frequently Used (LFU) value and the Cache Size (CS) of each node. The use of the equation for any other kind of parameter can be extrapolated from this example. The nodes do not exchange information about their view of the network and hence may have different settings regarding e.g. the observable range of each of the parameters. For example, from the point of view of R1 the maximum observed range for the value of LRU might be 1 second, while from the point of view of R3 the maximum observed range for the value of LRU might be 10 seconds.

For the sake of this example, we assume that the caching nodes have the following observed/estimated values for each of the parameters used in the bidding equation.

TABLE 1

|  | Node R1 | Node R2 | Node R3 |
|---|---|---|---|
| LRU (ms) | 10 | 200 | 1000 |
| $LRU_{Max\ of\ Range}$ | 1000 | 1000 | 1000 |
| LFU (times/second) | 50 | 10 | 10 |
| $LFU_{Max\ of\ Range}$ | 100 | 100 | 20 |
| CS (MB) | 200 | 500 | 500 |
| $CS_{Max\ of\ Range}$ | 1000 | 1000 | 1000 |
| $\alpha_1$ | 2 | 2 | 2 |
| $\alpha_2$ | 2 | 2 | 2 |
| $\alpha_3$ | 2 | 2 | 10 |
| $w_1$ | 0.4 | 0.3 | 0.4 |
| $w_2$ | 0.4 | 0.4 | 0.3 |
| $w_3$ | 0.2 | 0.3 | 0.3 |

Some clarification on the significance of the above presented values is given below:

LRU: The least recently used data object stored by R1 was most recently accessed while the least recently used data object stored by R3 was accessed about a second ago. This should lead R3 to calculate a higher bid than R1 and R2 with regard to this parameter (data objects that have not been accessed for a long time are preferably the first candidates for replacement). All nodes happen to have the same perspective about the maximum value of this parameter.

LFU: The least frequently used data object stored by R1 is accessed much more frequently than the least frequently used data object stored by the other nodes. That means that R1 should offer a low bid with regard to the LFU value. Since a high value of this parameter should preferably translate to a low bid value, the inverse of this parameter is used in Equation 1, i.e.

$$\left(\frac{1}{LFU}\right)$$

or $LFU^{-1}$, both in the numerator and the denominator (for the range value). Node R3 has a different view on what the maximum value of this parameter is, which will lead to a different bid for this parameter than node R2, even though they actually have the same LFU value.

CS: Node R1 has a smaller cache available compared to the other nodes, which leads to smaller bid values with regards to this parameter from R1 in Equation 1 (it may be preferable to cache less often in caches with a small memory). Since this can also be seen as the weak point of that node, it is also preferably the most important aspect which will determine whether R1 will cache the data object or not. For this reason, the weight that is given to this parameter ($w_3$ of R1) is much smaller than for the other two parameters (LRU and LFU) in order to affect negatively the chances of the data object being cached at the node with the smallest cache size.

Sensitivity parameters ($\alpha_1$-$\alpha_3$): These values determine the sensitivity of each parameter within its range, since they define the 'steepness' of the arctan function. A default value can be used in most cases (e.g. 2 in this example) but if a parameter is deemed important enough for a specific node and higher granularity is required in the bidding values that fall within the range of that parameter, then the sensitivity value of this parameter can be increased (e.g. $\alpha_3$ for R3 is increased to 10 in this example).

Parameter weights ($w_1$-$w_3$): These weights determine the contribution of each of the parameters to the final bid value of the node. Depending on the advantages or disadvantages of a node different parameters may be more or less important. These parameters can be set by the application or network administrator and they can be semi-statically adjustable. The sum of all weights for a node add up to 1 in this example (in this embodiment, the bid value is a value between 0 and 1).

Using the above information, the equation can be solved for each of the nodes in order to find the bid value that they will use. By filling in the values mentioned in Table 1, the bid value of each node can be determined.

R1 Bid Value:

$$\text{Bid}(R_1) = \left[0.4 * \arctan\left(\frac{10}{1000/2}\right) * \frac{2}{\pi}\right] + \quad \text{(Equation 2)}$$
$$\left[0.4 * \arctan\left(\frac{1/50}{1/(100/2)}\right) * \frac{2}{\pi}\right] +$$
$$\left[0.2 * \arctan\left(\frac{200}{1000/2}\right) * \frac{2}{\pi}\right]$$

$\text{Bid}(R_1) = 0.0051 + 0.2 + 0.0484$ $\text{Bid}(R_1) = 0.2535$

R2 Bid Value:

$$\text{Bid}(R_2) = \left[0.3 * \arctan\left(\frac{200}{1000/2}\right) * \frac{2}{\pi}\right] + \quad \text{(Equation 3)}$$
$$\left[0.4 * \arctan\left(\frac{1/10}{1/(100/2)}\right) * \frac{2}{\pi}\right] +$$
$$\left[0.3 * \arctan\left(\frac{500}{1000/2}\right) * \frac{2}{\pi}\right]$$

$\text{Bid}(R_2) = 0.0727 + 0.3497 + 0.15$ $\text{Bid}(R_2) = 0.5724$

R3 Bid Value:

$$\text{Bid}(R_3) = \left[0.4 * \arctan\left(\frac{1000}{1000/2}\right) * \frac{2}{\pi}\right] + \quad \text{(Equation 4)}$$
$$\left[0.3 * \arctan\left(\frac{1/10}{1/(20/2)}\right) * \frac{2}{\pi}\right] +$$
$$\left[0.3 * \arctan\left(\frac{500}{1000/10}\right) * \frac{2}{\pi}\right]$$

$\text{Bid}(R_3) = 0.2819 + 0.15 + 0.2623$ $\text{Bid}(R_3) = 0.6942$

Since Bid(R3)>Bid(R2)>Bid(R1), node R3 is the winner of the bid/auction, and it is going to cache the data object when it is returned.

For each auction group, there may be 0, 1 or more bid/auction winners, i.e. caching nodes that win the right to cache. For example, if all caching nodes in the auction group have an auction threshold which has a higher value than their LRU value (which means that the nodes are already caching very popular/recent data) and no available caching slot exists, none of these nodes is going to bid and hence there is no winner in this auction group and none of these nodes is going to cache the data object requested in the interest message. Although preferably the auction mechanism is implemented in such a way to allow that only one of the caching nodes in an auction group will eventually cache the item, the auction mechanism could alternatively grant all caching nodes that bid the same highest value in an auction group the right to cache.

To support performing an auction, interest messages may be extended with the following two fields:

bid_win (winning bid value): This field contains the current winning bid. Whenever the current node's bid is higher than this value, the current node will update this field. If the current node's bid is lower than or equal to the value of this field, then the field remains unchanged. In an alternative embodiment, the field is also updated if the current node's bid is equal to the value of this field.

bid_num (node counter): This field keeps track of the number of participating caching nodes. Thus every caching node will increment this field by one. If bid_exp has been defined (see configuration information below) and bid_num exceeds bid_exp, then bid_num will reset to zero and bid_win will be set to empty. This will also mark the end of the previous auction and the beginning of a new one, with a new group of caching nodes.

Additionally, the interest messages may carry a list of "request context" parameters, like the ones mentioned below:

hop_count: This field keeps track of the distance from the requester. Every router will increment this field by one.

latency: This field keeps track of the latency experienced by the interest message. Each router increases it with the measured/estimated latency from the previous hop.

To support performing an auction, the data messages may be extended with the following field:

ignore (ignore counter): This field represents the number of upcoming caching nodes that did not win the auction and thus will not cache the data object. Essentially, this field keeps track of how many caching nodes the data message has to go through before it will be cached, and therefore its value is decreased at every hop. When it reaches value 0, the data may be cached (depending on whether the "cache" field of the PIT—see below—is set to True or False) and the field ignore would consequently be set to the value of bid_ig (see PIT below) of that particular caching node: that is, the count of the subsequent caching nodes that need to be ignored is reset.

To support performing an auction, the PIT stored in the at least one memory of the node may be extended with the following two fields:

cache (bidding information): This field is set to True if the caching node has updated the bid_win field of the interest message, otherwise it is set to False. True means that a caching node has given its availability to store the incoming data object (i.e. it has bid on caching the data object). False means that the caching node will ignore the incoming data object with respect to caching.

bid_ig (losing bidder count): If the cache field is True, this field is set to the value of the bid_num field of the interest message, otherwise it will remain empty.

Furthermore, the caching node may store additional parameters in support of the auction, as described hereunder:

bid_exp: This field represents the number of caching nodes that can participate in one auction group. If it is absent, all caches on the interest path will participate in the same auction.

auction_thresh (auction threshold): Caching nodes with data more recent than this threshold will not take place in the auction. If it is absent, the caching node will take place in the auction, independently from the freshness of the data it stores.

An example of a process of transmitting an interest message and the process of receiving a data message is explained with the help of FIGS. 4 to 10. For the purpose of this example, the interest message that is sent out by the content requestor, i.e. the node from which the interest message originates, will look like a standard interest message without any additional field. This allows the content requester to be auction-agnostic.

In an alternative embodiment, the content requester may be aware of the auction mechanism and may include additional fields in the interest message to facilitate the auction, e.g. bid_win and bid_num. The values of these fields will either be left empty or undefined, or will contain values that are not in the range of actual potential values, to signal to the first node in the path that the bidding should start there.

Figure 4:
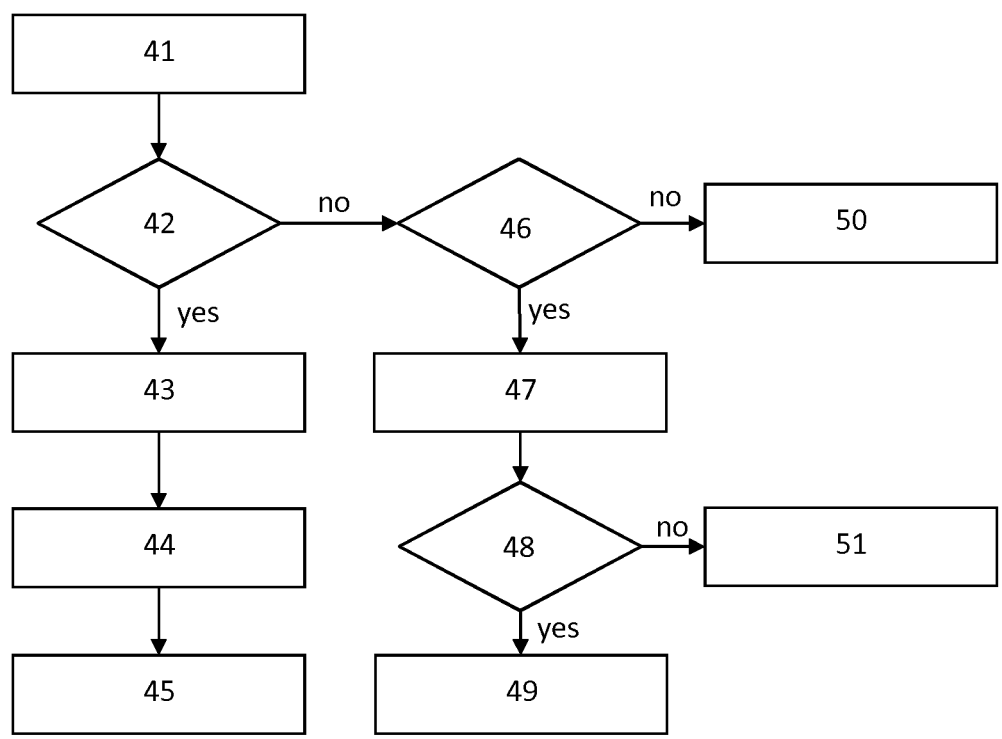
FIG. 4 is a flow diagram showing a process performed following the receipt of an interest message in an embodiment of the method of the invention.

FIG. 4 is a flow diagram showing a process performed following the receipt of an interest message in an embodiment of the method of the invention. The caching node will, after receiving the incoming interest message in step 41, determine whether the requested data object is stored in its cache memory in step 42. If the requested object has been cached by the caching node, it determines in step 43 that the auction is therefore finished, it makes a data message comprising the data object in step 44 and sends the data message back on the interest path in step 45.

If the requested object has not been cached by the caching node, it checks in step 46 whether the interest message comprises auction-specific fields, such as bid_win or bid_num. If not, then the caching node determines that it is the first node on the interest path that participates in the auction and performs step 50. Details of step 50 are provided in FIG. 5.

If the interest message comprises auction-specific fields, the caching node determines in step 47 that it is not the first node on the interest path that participates in the auction. It then checks whether bid_num is equal to bid_exp−1 in step 48 and performs step 49 if bid_num is equal to bid_exp−1, i.e. if the caching node is the first node of a new auction group (and should therefore ignore the bid_win field carried in the interest message). The caching node performs step 51 if bid_num is not equal to bid_exp−1, i.e. the caching node is part of the same auction group as its predecessor. Details of steps 49 and 51 are provided in FIGS. 6 and 7, respectively.

It may be possible for a caching node to override bid_exp value to end the current auction before its actual expiry time. This may be beneficial when a caching node has a low bandwidth uplink or when a caching node is located at the junction of different types of networks, e.g. at the boundary of fixed networks and vehicular ad hoc networks (VANETs) or at the boundary between continental links.

Figure 5:
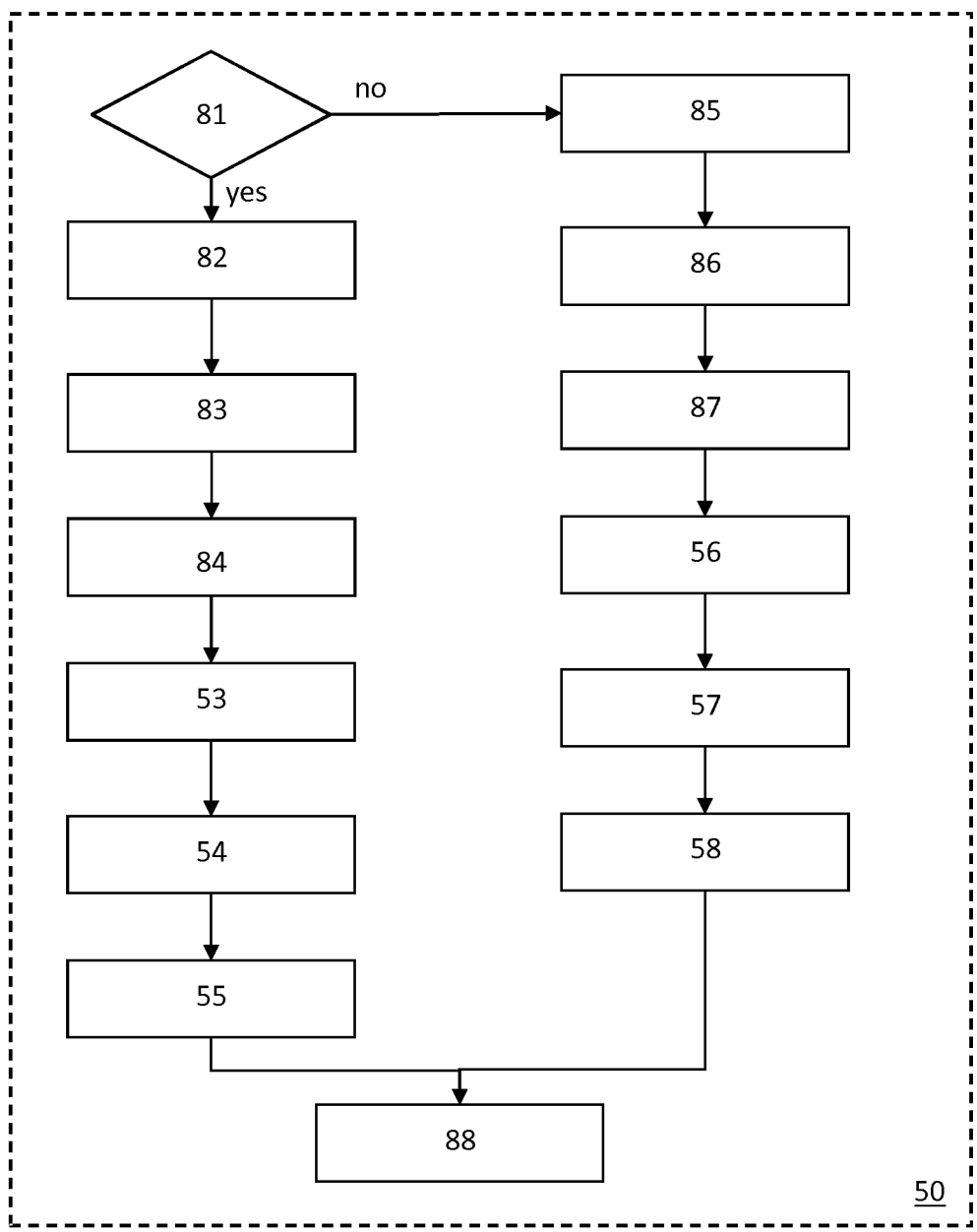
FIG. 5 is a flow diagram showing details of one of the steps of FIG. 4.

The first caching node that participates in the auction will first check its auction threshold (if defined) in step 81, see FIG. 5, and if the data cached in the node is older than the auction threshold, or if there are still caching slots available, it will decide to bid. To do so, it will calculate a bid value in step 82, e.g. in the manner previously described. It will then set the cache entry to true in the PIT in step 83 and the bid_ig entry to 0 in the PIT in step 84. After step 84, the caching node will add the request context to the interest message in step 53, add a bid_num field to the interest message with a value 0 in step 54 and add a bid_win field to the interest message with the calculated bid value as its value in step 55 before forwarding the interest message to the next hop as defined by the regular ICN forwarding strategy in step 88.

If the data cached in the node is younger than the auction threshold and there are no caching slots available, the caching node will decide not to bid in step 85. It will then set the cache entry to false in the PIT in step 86 and will leave the bid_ig entry undefined in the PIT in step 87. After step 87, the caching node will add the request context to the interest message in step 56, add a bid_num field to the interest message with a value 0 in step 57 and add a bid_win field to the interest message with no value in step 58 before forwarding the interest message to the next hop in step 88.

Figure 6:
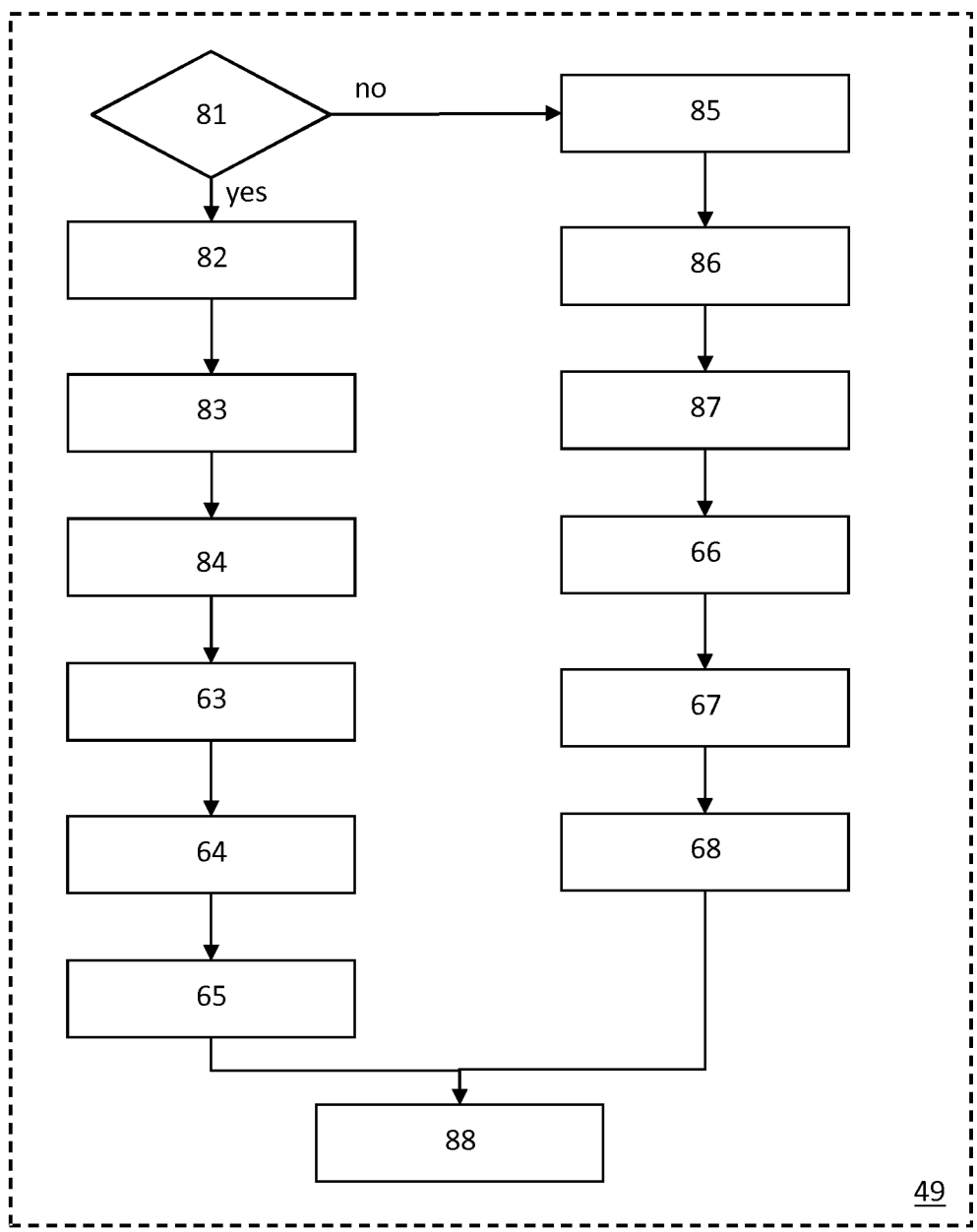
FIG. 6 is a flow diagram showing details of one of the steps of FIG. 4.

The first caching node of a new auction group will first check its auction threshold (if defined) in step 81, see FIG. 6, and if the data cached in the node is older than the auction threshold, or if there are still caching slots available, it will decide to bid. To do so, it will calculate a bid value in step 82, e.g. in the manner previously described. It will then set the cache entry to True in the PIT in step 83 and the bid_ig entry to 0 in the PIT in step 84. After step 84, the caching node will update the request context in the interest message in step 63, set the bid_num field of the interest message to 0 in step 64 and set the bid_win field to the calculated bid value in step 65 before forwarding the interest message to the next hop in step 88.

If the data cached in the node is younger than the auction threshold and there are no caching slots available, the caching node will decide not to bid in step 85. It will then set the cache entry to False in the PIT in step 86 and will leave the bid_ig entry undefined in the PIT in step 87. After step 87, the caching node will update the request context in the interest message in step 66, set the bid_num field of the interest message to 0 in step 67 and set the bid_win field of the interest message to no value in step 68 before forwarding the interest message to the next hop in step 88.

Figure 7:
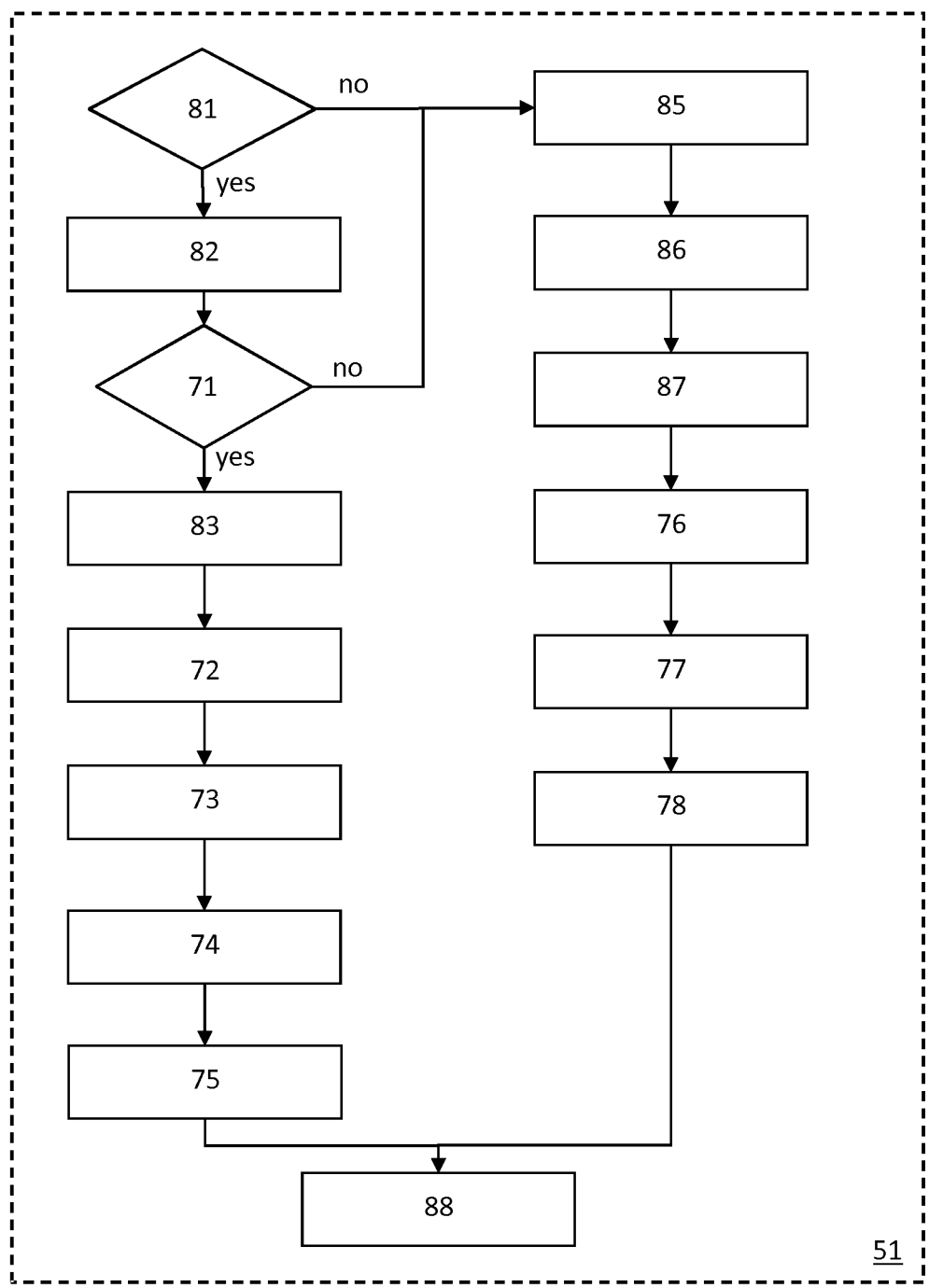
FIG. 7 is a flow diagram showing details of one of the steps of FIG. 4.

If the caching node is in the same auction group as its predecessor, it will first check its auction threshold (if defined) in step 81, see FIG. 7, and if the data cached in the node is older than the auction threshold, or if there are still caching slots available, it will decide to bid. To do so, it will calculate a bid value in step 82, e.g. in the manner previously described. It will then check in step 71 whether the calculated bid is higher than the bid_win value of the received interest message. If so, it will set the cache entry to True in the PIT in step 83 and the bid_ig entry to bid_num+1 in the PIT in step 72. After step 72, the caching node will update the request context in the interest message in step 73, increase the value of the bid_num field of the interest message by 1 in step 74 and set the bid_win field to the calculated bid value in step 75 before forwarding the interest message to the next hop in step 88.

If the calculated bid is not higher than the bid_win value of the received interest message in step 71 or if the data cached in the node is younger than the auction threshold and there are no caching slots available, the caching node will decide not to bid in step 85. It will then set the cache entry to False in the PIT in step 86 and will leave the bid_ig entry undefined in the PIT in step 87. After step 87, the caching node will update the request context in the interest message in step 76, increase the value of the bid_num field of the interest message by 1 in step 77 and leave the value of the bid_win field of the interest message unchanged in step 78 before forwarding the interest message to the next hop in step 88.

Once an interest message arrives at a node holding a copy of the data object (either an intermediate node having cached a copy of the data object or the producing node itself, e.g. server 35 of FIG. 3), that node will package the data object in a data message and will send it back on the interest path. The data message sent out by the node holding a copy of the data object may have the format of a standard data message, which allows the content provider to be auction-agnostic. In an alternative embodiment, the content provider may be aware of the auction mechanism and may include additional fields in the data message to facilitate the auction, e.g. an ignore field. The flow diagrams of FIGS. 4 to 7 describe a caching node receiving an interest message for a requested data object for which no interest is currently recorded in the PIT. When a caching node receives an interest message for which an interest is already recorded in the PIT, the downstream node will be associated with the already recorded interest/requested data object name, but no interest message will be forwarded. For what concerns this new interest, the auction therefore ends at this node.

Figure 8:
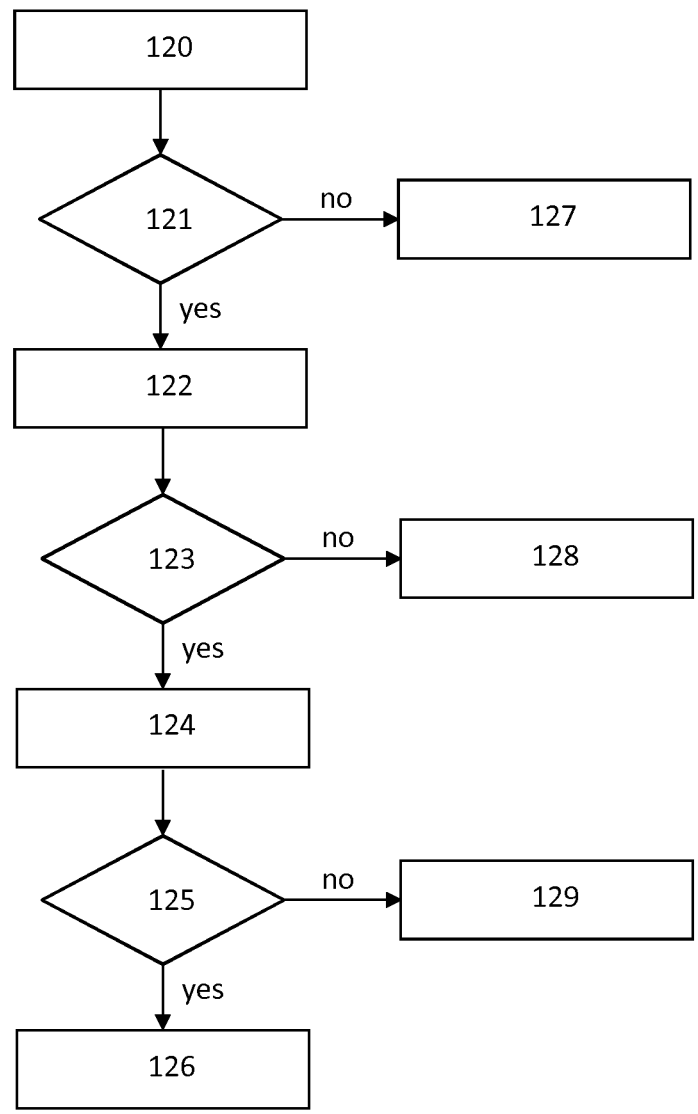
FIG. 8 is a flow diagram showing a process performed following the receipt of a data message in an embodiment of the method of the invention.

FIG. 8 is a flow diagram showing a process performed following the receipt of a data message in an embodiment of the method of the invention. Once a node receives the data message in step 120, it first checks whether there are any entries for the data object in its PIT in step 121. If there is no entry for the data object in the PIT, then the node determines in step 127 that the data message has reached its final destination, i.e. the originator of the interest message, and no further action is taken. If there is an entry for the data object in the PIT, the node determines in step 122 that the node is an intermediate node with regard to the received data message. If the node determines in step 123 that it supports caching, it handles the first interest recorded in the PIT in step 124. Details of Step 124 are provided in FIG. 9. If the node determines in step 123 that it does not support caching, it forwards the data message (unchanged) in step 128 on the communication interface(s) associated with the one or more interests recorded in the PIT for this data object.

After the first interest in the PIT has been handled in step 124, the node determines in step 125 whether there are any other interests for this data object in the PIT. If there are no other interests recorded in the PIT, the node will stop the process in step 129. If there are other interests recorded in the PIT, step 126 will be performed for each of these other interests. Details of step 126 are provided in FIG. 10.

Figure 9:
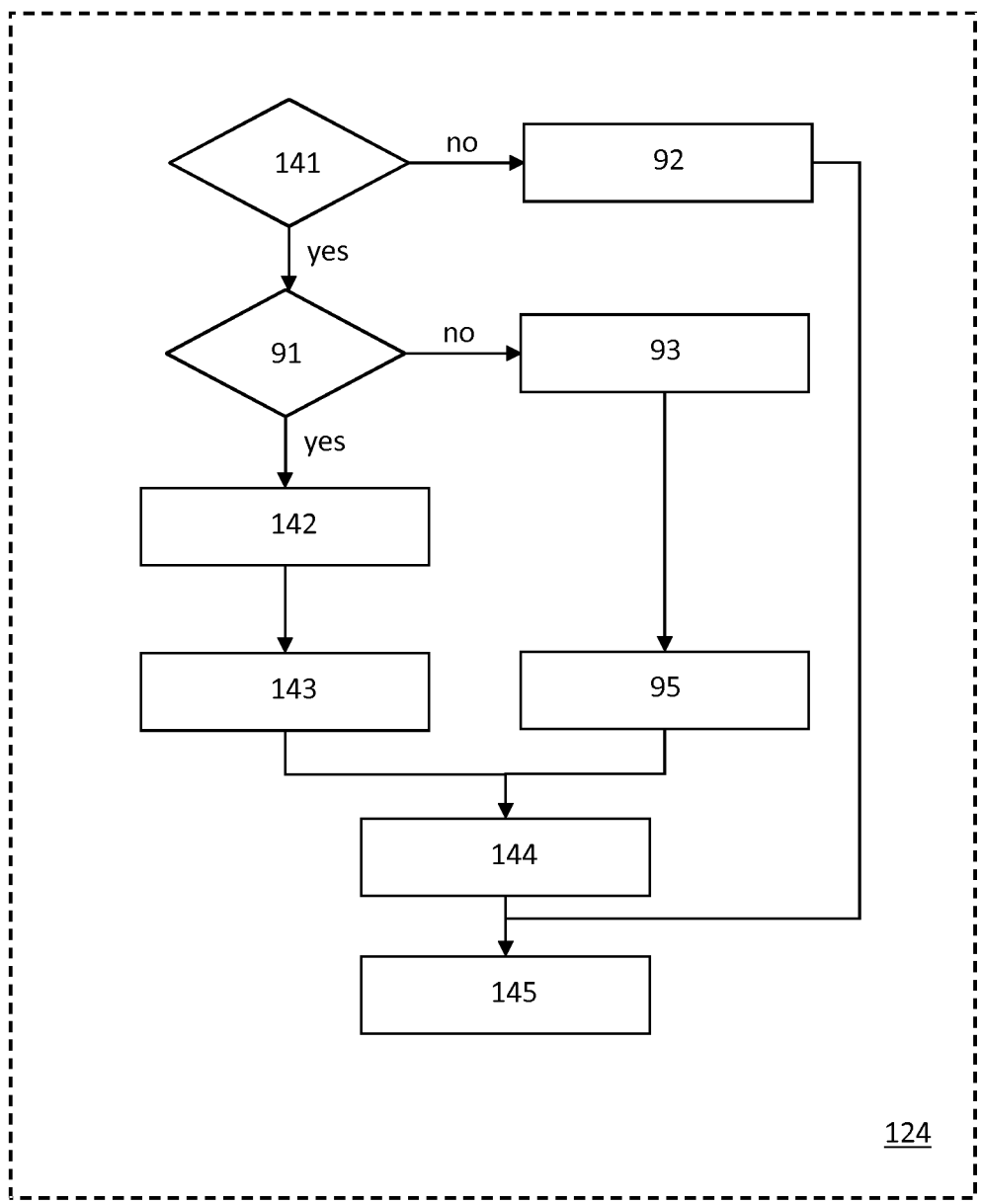
FIG. 9 is a flow diagram showing details of one of the steps of FIG. 8.

For the first interest in the PIT, the caching node will check whether the value of the cache field in its PIT is set to "True" in step 141, see FIG. 9. If so, it will check in step 91 whether the data message contains an ignore field and if so, whether the ignore field is set to 0. If the ignore field is absent, it means that no other upstream node (that participates in the auction) has cached the data object. If the ignore field is absent or set to 0, The node will proceed with caching the item in step 142 and will then set the ignore field of the data message to the value of the bid_ig field of its PIT in step 143. After step 143, a data message with the new ignore value is made in step 144 and forwarded further down on the interest path in step 145.

If however the value of the ignore field is determined to be greater than 0 in step 91, the node will decide in step 93 not to cache the data item. The node will then decrease the value of the ignore field by 1 in step 95 before making a data message with the new ignore value in step 144 and forwarding the data message further down on the interest path in step 145.

If on the contrary it is determined in step 141 that the value of the cache field in its PIT is set to "False" the node will decide not to cache the data object in step 92. Then, the node will forward the data message untouched further down the interest path in step 145, i.e. to the downstream node from which it received the interest message.

Figure 10:
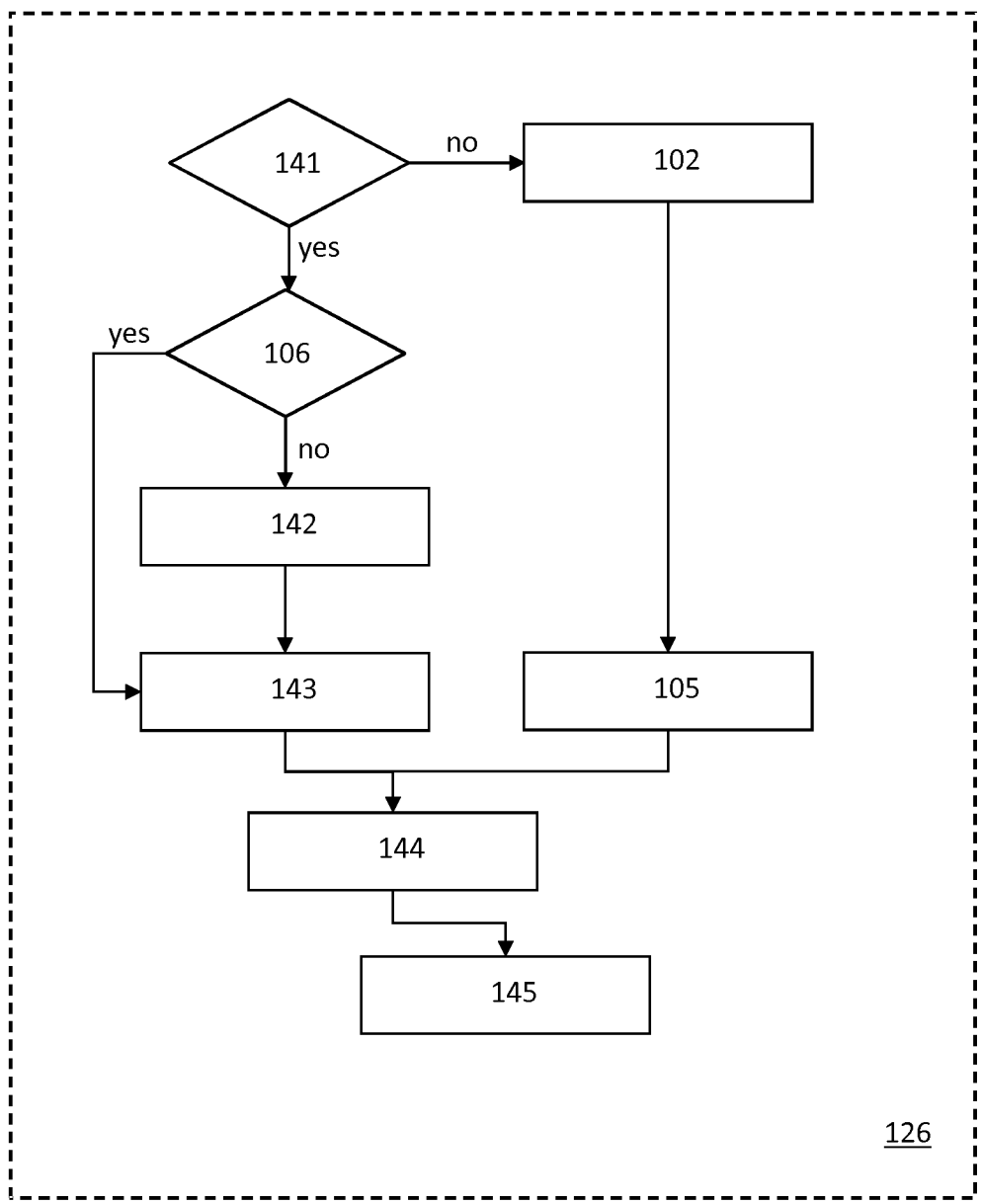
FIG. 10 is a flow diagram showing details of one of the steps of FIG. 8.

For an interest other than the first interest recorded in the PIT, the caching node will check in step 141, see FIG. 10, whether the value of the cache field in its PIT is set to "True". If so, the node will check in step 106 whether the data object has already been cached, e.g. when processing the previous interests in the PIT for this object. If not, the node will proceed with caching the data object in step 142 and then proceed to step 143. If the data object has already been cached, step 142 is skipped and step 143 is performed directly after step 106. In step 143, the node will set the ignore field of the data message to the value of the bid_ig field of its PIT. After step 143, a data message with the new ignore value is made in step 144 and forwarded further down on the interest path in step 145.

If on the contrary it is determined in step 141 that the value of the cache field in its PIT is set to "False" the node will decide not to cache the data object in step 102. Then, the node will set the ignore field of the data message to 0 in step 105, make a data message with the new ignore value in step 144 and forward the data message further down on the interest path in step 145

In an alternative embodiment, it may be desirable that the data is cached only once between the requester and the data source. In this case, all the nodes on the path may take part in the same auction, i.e. only one auction group will exist, and the caching node may not store (or may ignore the value of) a bid_exp field. For example, when the bid_exp has a special value, e.g. 0, the caching node may know that there is only one auction group.

The bid_exp field might also be absent if the number of auction groups is decided by the source of the data object. More fields could be attached to the interest message that could help in communicating extra information to the uplink caching nodes. This information then could be used by the caching node with the requested content, or by the server, to then choose the appropriate value of bid_exp. Thus instead of the setting of bid_exp on the way from user to the source, in this case bid_exp value will be set on the return path from the server towards the user.

Figure 11:
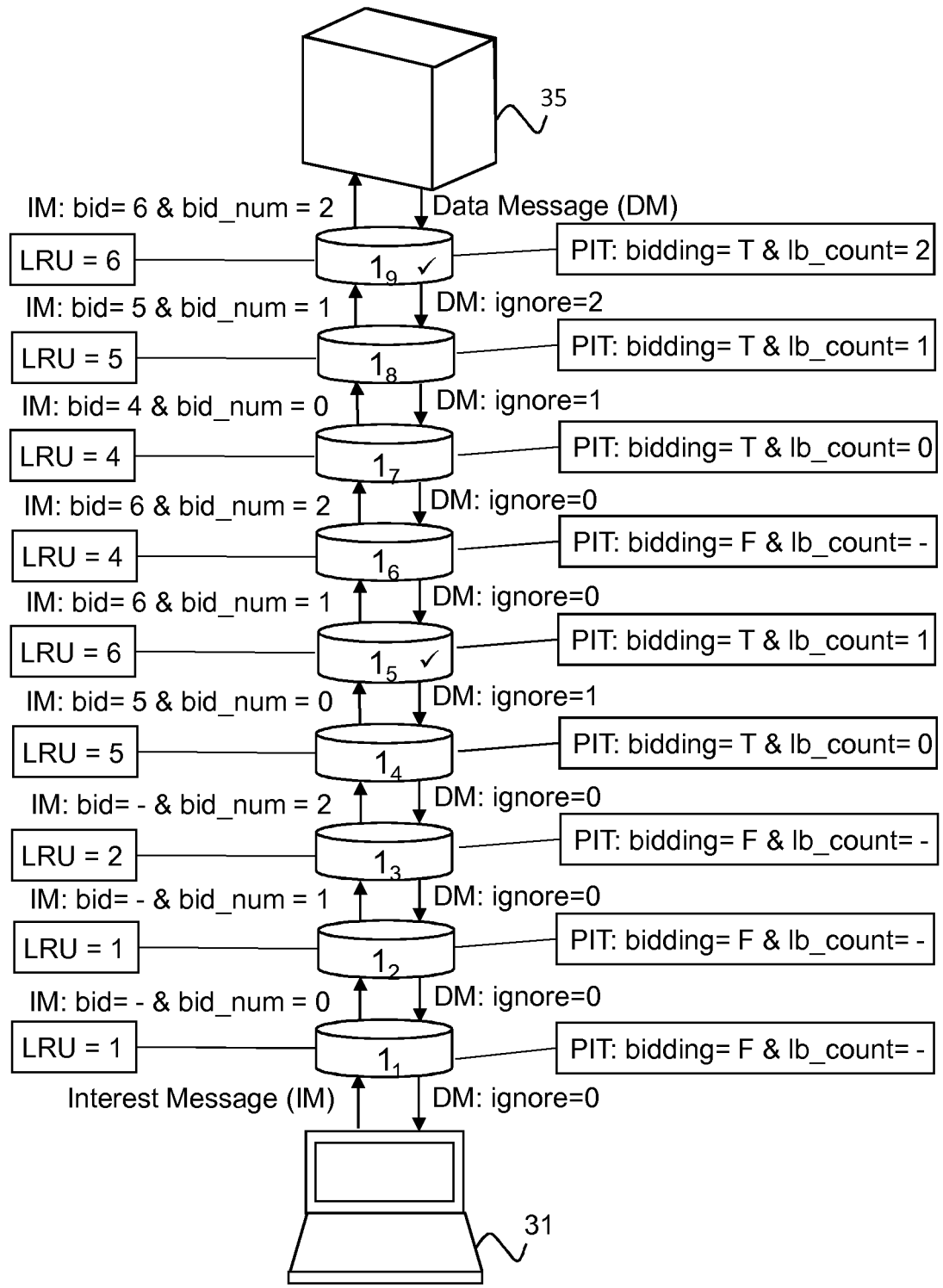
FIG. 11 shows an example of fields and values inserted into the interest message, data message and PIT of the invention.

FIG. 11 shows an example of fields and values inserted into the interest message, data message and PIT of the invention. FIG. 11 depicts the same network path as FIG. 3. In this example, a node's bid is only based on its LRU value and a bid_exp of 3 nodes and an auction_thresh of 3 seconds are used. In this example, a network node only bids when its LRU value is higher than or equal to the auction threshold auction_thresh. The LRU value represents how long ago the Least Recently Used cached data object was accessed.

The user device 31 from which the interest message originates is auction-agnostic, i.e. it transmits a conventional interest message without additional fields to caching node $1_1$. Caching node $1_1$ receives the interest message from user device 31, but decides not to bid, because its LRU value (1 second) is lower than the auction threshold. It sets the bidding information (e.g. value of the cache field) of its PIT to False and leaves the losing bidder counter (e.g. value of the bid_ig field) of its PIT undefined. Since it is the first node that takes part in the auction, it does add bid (also referred to as bid_win) and bid_num fields to the interest message before forwarding the interest message to caching node $1_2$. The bid value is left undefined and the bid_num value (i.e. the node counter) is set to 0.

Caching node $1_2$ receives the interest message from (downstream) caching node $1_1$, but decides not to bid, because its LRU value (1 second) is lower than the auction threshold. It sets the bidding information (e.g. value of the cache field) of its PIT to False and leaves the losing bidder count (e.g. value of the bid_ig field) of its PIT undefined. With regard to the interest message, caching node $1_2$ leaves the bid value undefined, increases the bid_num value (i.e. the node counter) to 2 and then forwards the interest message to (upstream) caching node $1_3$.

Caching node $1_3$ receives the interest message from caching node $1_2$, but decides not to bid, because its LRU value (2 seconds) is lower than the auction threshold. It sets the bidding information (e.g. value of the cache field) of its PIT to False and leaves the losing bidder count (e.g. value of the bid_ig field) of its PIT undefined. With regard to the interest message, caching node $1_3$ leaves the bid value undefined, increases the bid_num value to 2 and then forwards the interest message to caching node $1_4$.

Caching node $1_4$ receives the interest message from caching node $1_3$ and first determines that bid_num is equal to bid_exp−1, i.e. that caching node $1_4$ is the first node of a new auction group. Caching node $1_4$ then decides to calculate a bid value, because its LRU value (5 seconds) is higher than the auction threshold. It calculates a bid value of 5 (equal to the LRU value). In an alternative embodiment, bid values are normalized between the values 0 and 1 (an LRU value of 5 may be normalized according to Equation 1, and for example take the value of 0.5). Caching node $1_4$ then sets the bidding information (e.g. value of the cache field) of its PIT to True and sets the losing bidder count (e.g. value of the bid_ig field) of its PIT to 0. It then sets the bid value of the interest message to its calculated bid value and resets bid_num (i.e. the node counter) to zero before forwarding the interest message to caching node $1_5$.

Caching node $1_5$ receives the interest message from caching node $1_4$ and decides to calculate a bid value, because its LRU value (6 seconds) is higher than the auction threshold. It calculates a bid value of 6 (equal to the LRU value). As the calculated bid value (6) is higher than the received bid value (5), caching node $1_5$ sets the bid value of the interest message to the calculated bid value, sets the bidding information (e.g. value of the cache field) of its PIT to True and sets the losing bidder count (e.g. value of the bid_ig field) of its PIT to bid_num+1, i.e. 1. It further increases the bid_num (i.e. the node counter) value to 1 and then forwards the interest message to caching node $1_6$.

Caching node $1_6$ receives the interest message from caching node $1_5$ and decides to calculate a bid value, because its LRU value (4 seconds) is higher than the auction threshold. It calculates a bid value of 4 (equal to the LRU value). As the calculated bid value (4) is lower than the received bid value (6), caching node $1_6$ leaves the bid field in the interest message unchanged, sets the bidding information (e.g. value of the cache field) of its PIT to False and sets the losing bidder count of its PIT to undefined. It further increases the bid_num (i.e. the node counter) value to 2 and then forwards the interest message to caching node $1_7$.

Caching node $1_7$ receives the interest message from caching node $1_6$ and first determines that bid_num is equal to bid_exp−1, i.e. that caching node $1_7$ is the first node of a new auction group. Caching node $1_7$ then decides to calculate a bid value, because its LRU value (4 seconds) is higher than the auction threshold. It calculates a bid value of 4 (equal to the LRU value). Caching node $1_7$ then sets the bidding information (e.g. value of the cache field) of its PIT to True and sets the losing bidder count (e.g. value of the bid_ig field) of its PIT to 0. It then sets the bid value of the interest message to its calculated bid value and resets bid_num (i.e. the node counter) to zero before forwarding the interest message to caching node $1_8$.

Caching node $1_8$ receives the interest message from caching node $1_7$ and decides to calculate a bid value, because its LRU value (5 seconds) is higher than the auction threshold. It calculates a bid value of 5 (equal to the LRU value). As the calculated bid value (5) is higher than the received bid value (4), caching node $1_8$ sets the bid value of the interest message to the calculated bid value, sets the bidding information (e.g. value of the cache field) of its PIT to True and sets the losing bidder count (e.g. value of the bid_ig field) of its PIT to bid_num+1, i.e. 1. It further increases the bid_num (i.e. the node counter) value to 1 and then forwards the interest message to caching node $1_9$.

Caching node $1_9$ receives the interest message from caching node $1_8$ and decides to calculate a bid value, because its LRU value (6 seconds) is higher than the auction threshold. It calculates a bid value of 6 (equal to the LRU value). As the calculated bid value (6) is higher than the received bid value (5), caching node $1_9$ sets the bid value of the interest message to the calculated bid value, sets the bidding information (e.g. value of the cache field) of its PIT to True and sets the losing bidder count (e.g. value of the bid_ig field) of its PIT to bid_num+1, i.e. 2. It further increases the bid_num (i.e. the node counter) value to 2 and then forwards the interest message to server 35.

When the server 35 receives the interest message from caching node $1_9$, it does not recognize the bid and bid_num fields, but it determines that it has stored the requested data object and transmits the requested data object to the caching node $1_9$ in a data message. The server 35 is auction-agnostic, i.e. it transmits a conventional data message without additional fields to caching node $1_9$.

Caching node $1_9$ receives the data message from server 35 and determines from its PIT that the bidding information (e.g. value of the cache field) is set to True and that the ignore counter is absent from the received data message. It concludes that it has won the bid in its auction group and caches the data object. It then adds an ignore counter to the data message and sets it to the value of the losing bidder count (e.g. value of the bid_ig field), i.e. 2, before forwarding the data message to caching node $1_8$.

Caching node $1_8$ receives the data message from (upstream) caching node $1_9$ and determines from its PIT that the bidding information (e.g. value of the cache field) is set to True and from the received data message that the ignore counter is not set to 0. It concludes that it has lost the bid in its auction group and does not cache the data object. It then decreases the value of the ignore counter by 1, i.e. to 1 before forwarding the data message to (downstream) caching node $1_7$.

Caching node $1_7$ receives the data message from caching node $1_8$ and determines from its PIT that the bidding information (e.g. value of the cache field) is set to True and from the received data message that the ignore counter is not set to 0. It concludes that it has lost the bid in its auction group and does not cache the data object. It then decreases the value of the ignore counter by 1, i.e. to 0 before forwarding the data message to caching node $1_6$.

Caching node $1_6$ receives the data message from caching node $1_7$ and determines from its PIT that the bidding information (e.g. value of the cache field) is set to False. It concludes that it did not bid for storing the data object and does not cache the data object. It leaves the value of the ignore counter unchanged at 0 and forwards the data message to caching node $1_5$.

Caching node $1_5$ receives the data message from caching node $1_6$ and determines from its PIT that the bidding information (e.g. value of the cache field) is set to True and from the received data message that the ignore counter is set to 0. It concludes that it has won the bid in its auction group and caches the data object. It then sets the ignore counter of the data message to the value of the losing bidder count (e.g. value of the bid_ig field), i.e. 1, before forwarding the data message to caching node $1_4$.

Caching node $1_4$ receives the data message from caching node $1_5$ and determines from its PIT that the bidding information (e.g. value of the cache field) is set to True and from the received data message that the ignore counter is not set to 0. It concludes that it has lost the bid in its auction group and does not cache the data object. It then decreases the value of the ignore counter by 1, i.e. to 0 before forwarding the data message to caching node $1_3$.

Caching node $1_3$ receives the data message from caching node $1_4$ and determines from its PIT that the bidding information (e.g. value of the cache field) is set to False. It concludes that it did not bid for storing the data object and does not cache the data object. It leaves the value of the ignore counter unchanged at 0 and forwards the data message to caching node $1_2$.

Caching node $1_2$ receives the data message from caching node $1_3$ and determines from its PIT that the bidding information (e.g. value of the cache field) is set to False. It concludes that it did not bid for storing the data object and does not cache the data object. It leaves the value of the ignore counter unchanged at 0 and forwards the data message to caching node $1_1$.

Caching node $1_1$ receives the data message from caching node $1_2$ and determines from its PIT that the bidding information (e.g. value of the cache field) is set to False. It concludes that it did not bid for storing the data object and does not cache the data object. It leaves the value of the ignore counter unchanged at 0 and forwards the data message to user device 31. User device 31 does recognize the ignore counter, but determines that there are no entries for this data object in the PIT and that the data message has therefore reached the content requestor.

In another embodiment, the caching node is a caching proxy server used by Network Service Providers (NSP) to more efficiently utilize their networks. Different types of proxy servers may reside on various points between a User Agent (UA) and the Content Service Provider (CSP). When a proxy server is able to cache content it is usually referred to as a caching proxy.

By adding a special bid HTTP entity-header to HTTP requests and responses or by adding or extending the Cache-Control header, auction-based caching may be enabled in caching proxies. Adding or extending the cache control header in HTTP requests and responses may be done without having to change the HTTP protocol specification and is backwards compatible according to RFC 2616 Section 14.9.6. Also adding an extra entity-header in HTTP requests and responses is supported by RFC 2616 Section 7.1.

Auction-based caching is enabled by adding the bid_win and bid_num fields and optionally the fields hop_count and latency to the cache control header or entity-header of the HTTP request and the ignore field to the cache control header or entity-header of the HTTP response. The caching proxies, comprising one or more tables or databases, will also be extended with the bid_ig, cache, and optionally the bid_exp and auction_thresh fields. FIGS. 3-11 then also apply to this embodiment where interest message is to be read as HTTP request and data message as HTTP response.

When an intermediate caching proxy receives an HTTP request, is the first node and decides to place a bid (reference 82 in FIG. 5), the caching proxy first checks whether the cache control header or entity-header is present in the HTTP request. If present, it checks whether the bid_num and bid_win fields are present in the cache control header or entity-header. If present, it continues with the flow of FIG. 5. If the cache control header or entity-header is not present in the HTTP request, the caching proxy will add it. If the cache control header or entity-header is present in the HTTP request, but does not comprise the bid_num and bid_win fields, it adds the fields to the entity-header or extends the cache control header of the HTTP request by adding the fields. Then it will continue with the flow of FIG. 5.

Figure 12:
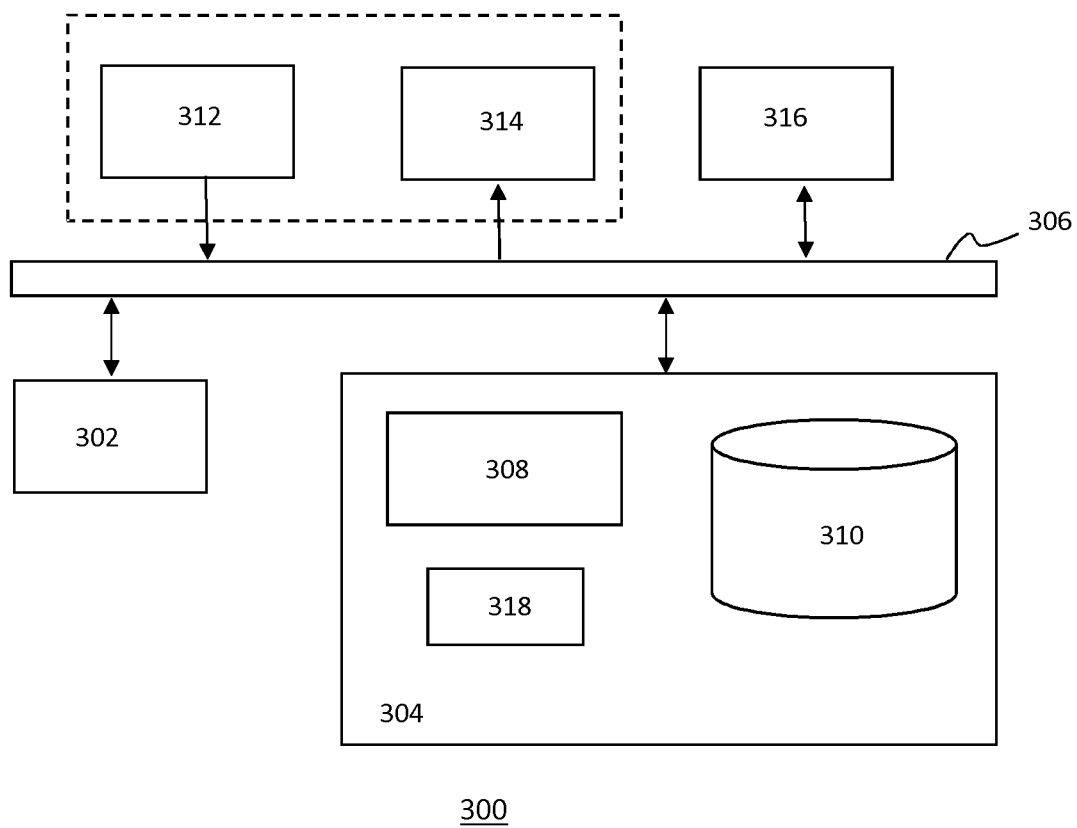
FIG. 12 is a block diagram of an exemplary data processing system for performing the method of the invention.

FIG. 12 depicts a block diagram illustrating an exemplary data processing system that may perform the methods as described with reference to FIG. 2 and FIGS. 4 to 10.

As shown in FIG. 12, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 12, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 17) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Figure 13:
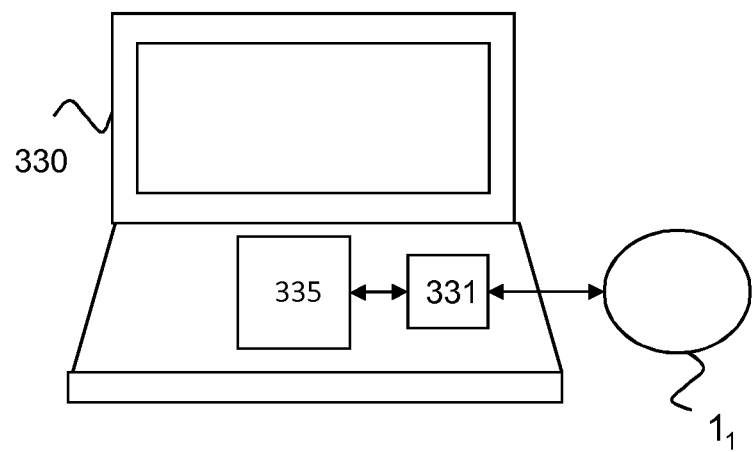
FIG. 13 is a block diagram of the endpoint node of the invention.

The invention also relates to an endpoint node 330 comprising at least one communication interface 331 and at least one processor 335, see FIG. 13. The at least one processor 335 is configured to determine a name of a requested data object (e.g. by allowing a user to specify this name), to create an interest message comprising the name of the requested data object and a bid field for inserting a bid value, the bid value being left undefined (e.g. no value or a value '0') so as to indicate that an auction of the right to cache the requested data object should start, and to transmit the interest message to an upstream node $1_1$ on the at least one communication interface 331. The endpoint node 330 may be, for example, a user device 31 and may comprise, for example, a user interface, e.g. a touch screen. The endpoint node 330 may be a laptop, tablet, mobile phone or a device embedded in a vehicle, for example. The at least one processor 335 may be an ARM or Qualcomm processor, for example. The endpoint node 330 may further comprise other components typical for an endpoint node, e.g. a memory and a power supply. The at least one communication interface 331 may comprise a wireless data (e.g. cellular and/or WiFi) transceiver for example.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A network node, comprising:
at least one communication interface;
at least one memory; and
at least one processor, configured to:
   receive an interest message on said at least one communication interface from a downstream node, said interest message comprising a name of a requested data object;
   determine whether to bid for storing said requested data object in said at least one memory;
   calculate a bid value;
   forward said interest message to an upstream node on said at least one communication interface, said interest message including said calculated bid value in dependence on at least said determination whether to bid;
   receive a data message comprising said requested data object from said upstream node on said at least one communication interface;
   determine from at least said data message whether said network node won said bid;
   store said data object in said at least one memory if said network node won said bid; and
   forward said data message to said downstream node on said at least one communication interface.

2. The network node of claim 1, wherein said received interest message further comprises a received bid value and said at least one processor is further configured to:
   include said calculated bid value in said interest message if said determination whether to bid was positive and said calculated bid value represents a higher bid than said received bid value.

3. The network node of claim 1, wherein said at least one processor is further configured to:

record bidding information in said at least one memory, said bidding information representing whether said network node included said calculated bid value in said interest message.

4. The network node of claim 3, wherein said at least one processor is further configured to:
  determine from at least said data message and said bidding information whether said network node won said bid.

5. The network node of claim 4, wherein said received data message comprises an ignore counter, said ignore counter representing an amount of downstream nodes that lost said bid as determined by said upstream node or a further upstream node, and wherein said at least one processor is further configured to:
  determine from at least said ignore counter and said bidding information whether said network node won said bid.

6. The network node of claim 5, wherein said at least one processor is further configured to:
  increment a node counter in said interest message before forwarding said interest message to said upstream node, said node counter representing an amount of downstream nodes.

7. The network node of claim 6, wherein said at least one processor is further configured to:
  record a losing bidder count in said at least one memory if said network node included said calculated bid value in said interest message, said losing bidder count being based on said node counter included in said received interest message and representing an amount of downstream nodes that lost said bid as determined by said network node.

8. The network node of claim 7, wherein said at least one processor is further configured to:
  set said ignore counter in said data message based on said losing bidder count before forwarding said data message to said downstream node if said network node won said bid.

9. The network node of claim 1, wherein said at least one processor is further configured to:
  determine whether to bid for storing said requested data object in said at least one memory by checking whether at least one empty slot is available on said at least one memory and/or whether a least recently cached item is older than a certain age threshold.

10. The network node of claim 1, wherein said at least one processor is further configured to:
  determine whether to bid for storing said requested data object in said at least one memory by checking whether said calculated bid value represents a bid which exceeds a certain auction threshold.

11. An endpoint node, comprising:
  at least one communication interface; and
  at least one processor configured to:
    determine a name of a requested data object;
    create an interest message comprising said name of said requested data object and a bid field for inserting a bid value, said bid value being left undefined so as to indicate that an auction of a right to cache said requested data object should start; and
    transmit said interest message to an upstream node on said at least one communication interface.

12. A method of receiving an interest message, the method comprising:
  receiving an interest message on at least one communication interface from a downstream node, said interest message comprising a name of a requested data object;
  determining whether to bid for storing said requested data object in at least one memory;
  calculating a bid value;
  forwarding said interest message to an upstream node on said at least one communication interface, said interest message including said calculated bid value in dependence on at least said determination whether to bid;
  receiving a data message comprising said requested data object from said upstream node on said at least one communication interface;
  determining from at least said data message whether a network node won said bid;
  storing said data object in said at least one memory if said network node won said bid; and
  forwarding said data message to said downstream node on said at least one communication interface.

13. A non-transitory computer medium having stored thereon one or more computer programs comprising at least one software code portion that, when run on a computer system, causes the computer system to perform the method of claim 12.

14. A network node, comprising:
  at least one communication interface;
  at least one memory; and
  at least one processor configured to:
    receive an HTTP request for a data object on said at least one communication interface from a downstream node;
    determine whether to bid for storing said requested data object in said at least one memory;
    calculate a bid value;
    forward said HTTP request to an upstream node on said at least one communication interface, said HTTP request including said calculated bid value in dependence on at least said determination whether to bid;
    receive a response message comprising said requested data object from said upstream node on said at least one communication interface
    determine from at least said response message whether said network node won said bid;
    store said data object in said at least one memory if said network node won said bid; and
    forward said response message to said downstream node on said at least one communication interface.

15. A method of receiving an HTTP request, the method comprising:
  receiving said HTTP request for a data object on at least one communication interface from a downstream node;
  determining whether to bid for storing said requested data object in at least one memory;
  calculating a bid value;
  forwarding said HTTP request to an upstream node on said at least one communication interface, said HTTP request including said calculated bid value in dependence on at least said determination whether to bid;
  receiving a response message comprising said requested data object from said upstream node on said at least one communication interface;
  determining from at least said response message whether a network node won said bid;
  storing said data object in said at least one memory if said network node won said bid; and
  forwarding said response message to said downstream node on said at least one communication interface.

16. A non-transitory computer medium having stored thereon one or more computer programs comprising at least one software code portion that, when run on a computer system, causes the computer system to perform the method of claim 15.

* * * * *